N. W. TAUSSIG.
PROCESS OF MAKING INVERTED SUGAR SYRUP.
APPLICATION FILED FEB. 7, 1916.
1,181,086.
Patented Apr. 25, 1916.
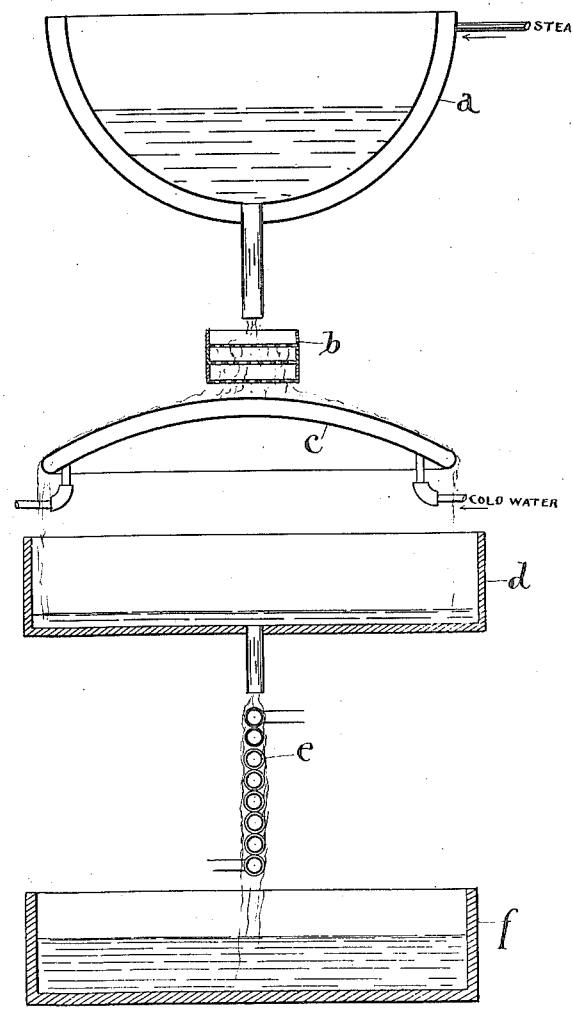
Inventor:
Noah W. Taussig
by S. W. Bates
Atty.

UNITED STATES PATENT OFFICE.

NOAH W. TAUSSIG, OF NEW YORK, N. Y.

PROCESS OF MAKING INVERTED-SUGAR SYRUP.

1,181,086.     Specification of Letters Patent.     Patented Apr. 25, 1916.

Application filed February 7, 1916. Serial No. 76,537.

*To all whom it may concern:*

Be it known that I, NOAH W. TAUSSIG, a citizen of the United States, residing at New York, in the county of New York and State of New York, have invented certain new and useful Improvements in Processes of Making Inverted-Sugar Syrup, of which the following is a specification.

My invention relates to the manufacutre of the inverted sugar syrup known on the market as "Nulomoline."

The object of the invention is to produce a syrup from pure cane sugar in which the sugar will be completely inverted, clear and colorless, highly hygroscopic, free from acids and alkalis and adapted to many of the uses which will be hereinafter pointed out.

In carrying out my process in practice, I make an aqueous solution of refined cane sugar and add a very small quantity of citric acid and gum arabic, the latter having previously been dissolved in water and being preferably added after the boiling has begun. This is heated for about one hour to a temperature of from 210 to 218 degrees Fahrenheit and it is then raised to 232 1/2 and immediately cooled before caramelization begins. By this process the citric acid starts the inversion of the sugar and the heat carries it on and completes it. The result is a clear, homogeneous, colorless product, highly hygroscopic and free from acid or alkaline reactions. The small amount of citric acid used is completely eliminated during the operation probably by combining with the sugar to form new organic compounds. The gum prevents the separation of the dextrose and levulose after the product is complete where otherwise these two elements would tend to separate.

It will be seen that the product is practically pure sugar and has been analyzed with the following result:

"Direct polarization at 20 degrees C.................... −20.80 V
Clerget method indicates traces of cane sugar
Levulose}
Dextrose} ............................................. 81.50%
Water by deduction..................................... 18.475%
Ash .................................................. 0.025%

Reaction neutral; examined for acids,— chlorhydric, sulfuric, phosphoric, not present. Dextrin or starch not present.

Nulomoline is highly hygroscopic; 6.1813 gr. exposed to the air but protected from dust, increased to 6.1978 gr. in 24 hours. Average moistener in the air during period, according to the U. S. Weather Report, 65%. Experiments made with parchment paper, to determine the softening influence of Nulomoline in comparison with glycerin, proved that the pliability of the paper in hot and dry as well as in cold surroundings compared favorably."

The product is used very successfully by confectioners, by bakers to prevent the cracking of the surfaces of biscuits, cake, etc. It is used in large quantities by tobacco manufacturers for holding the moisture, softening the leaf and adding flavor and it is used in many arts in place of glycerin where a non-drying and softening material is wanted. It is a perfectly pure and healthful food product easily digestible and unfermentable.

In carrying out my process, I make use of apparatus which I have found peculiarly adapted for the purpose and which is illustrated by means of the diagram shown in the accompanying drawing.

Referring to the drawing, *a* represents a steam jacketed kettle in which in ordinary practice the ingredients are mixed in the following proportions: Eight barrels of refined granulated cane sugar, free from coloring matter, 90 gallons of distilled water, 32 ounces of citric acid in crystals and 4 pounds of sun bleached gum arabic. Steam is turned on and the mixture is raised to 210 degrees F. and kept between this temperature and 218 degrees for about one hour, the mixture being stirred with paddles during that time to thoroughly dissolve the sugar. At the end of one hour more steam is turned on and the temperature is quickly raised to the boiling point and the charge is boiled until a temperature of 232 1/2 degrees F. is reached. At this point the steam is turned off, about four gallons of cold water added to check the boiling and the charge is allowed to run out of the kettle passing through the screens *b* onto the surface of the umbrella-shaped, water-jacketed cooler *c*. The liquid spreads out from the center of this cooler forming a thin layer and dripping from the edges into the tank *d*. The effect of the cooler *c* is to immediately lower the temperature of the liquid below the point where inversion of the sugar takes place and at once check the process. From the tank *d*, the liquid runs over the Beaudelet cooler *e* where the cooling process is completed, discharging into the tank *f* from which it is removed into barrels for shipment.

Variations may be made in my process without departing from the spirit of my invention as expressed in the claims. For instance the gum may be omitted giving substantially the same product except that the dextrose and levulose would be liable to separate. This might be a disadvantage in some cases while in others it would be immaterial. Again, some other form of organic acid might be substituted although I know of no acid which would give good results and produce such a perfect product as citric acid.

When I use the word "gum" I desire to be understood as including any equivalent gummy material which will act like gum arabic to mechanically bind the two materials together or prevent their mechanical separation or the settling of the dextrose crystals.

Claims:

1. The process of making inverted sugar syrup which consists of boiling an aqueous sugar solution with an organic acid to a temperature of substantially 232 1/2 degrees Fahrenheit and suddenly cooling.

2. The process of making inverted sugar syrup which consists of boiling an aqueous sugar solution with citric acid to 232 1/2 degrees Fahrenheit and suddenly cooling.

3. The process of making inverted sugar syrup which consists of boiling an aqueous sugar solution with an organic acid to a temperature just below the point of caramelization and suddenly cooling.

4. The process of making inverted sugar syrup which consists of boiling an aqueous sugar solution with citric acid to a temperature just below that of caramelization and suddenly cooling.

5. The process of making inverted sugar syrup which consists of mixing an aqueous solution of sugar with citric acid maintaining this mixture for a considerable period to 210 to 218 degrees Fahrenheit then raising it to 232 1/2 Fahrenheit and suddenly cooling.

6. The process of making inverted sugar syrup which consists of mixing an aqueous solution of sugar with citric acid maintaining this mixture for a considerable time at 210 to 218 Fahrenheit, then raising to a temperature just below that of caramelization and suddenly cooling.

7. The process of making inverted sugar syrup which consists of boiling an aqueous sugar solution with substantially 1/14 of one per cent. of citric acid as compared with sugar, both dry weights and cooling 8. The process of making inverted sugar syrup which consists of mixing an aqueous solution of sugar with a small amount of citric acid to start the inversion, completing the inversion by boiling and finally cooling, the amount of citric acid being so small that it does not appear in the product.

9. The process of making inverted sugar syrup which consists of boiling an aqueous sugar solution with an organic acid and an edible gum and finally cooling.

10. The process of making inverted sugar syrup which consists of boiling an aqueous sugar solution with citric acid and gum arabic and cooling.

11. The process of making inverted sugar syrup which consists of boiling an aqueous sugar solution with citric acid to cause the inversion of the sugar and incorporating an edible gum to prevent the mechanical separation of the dextrose and levulose.

12. The process of making inverted sugar syrup which consists of boiling an aqueous sugar solution with substantially 1/14 of one per cent. of citric acid and 1/7 of one per cent. of an edible gum, with relation to dry weight of sugar, and cooling.

13. The process of making inverted sugar syrup which consists of mixing an aqueous solution of sugar with 1/14 of one per cent. of citric acid and 1/7 of one per cent. of gum arabic with relation to the dry weight of sugar, heating to 210 to 218 for one hour, then suddenly raising the temperature to 232 1/2 degrees Fahrenheit and quickly cooling.

14. The process of making inverted sugar syrup which consists of boiling an aqueous solution of sugar with an organic acid to a point just below that of caramelization, then suddenly cooling to check the inversion and subjecting the mass to a subsequent cooling operation to prevent caramelization by latent heat.

In testimony whereof I have affixed my signature.

NOAH W. TAUSSIG.